Jan. 18, 1938.    R. PAXTON    2,106,061
ELECTRIC SWITCH GEAR
Filed March 12, 1936
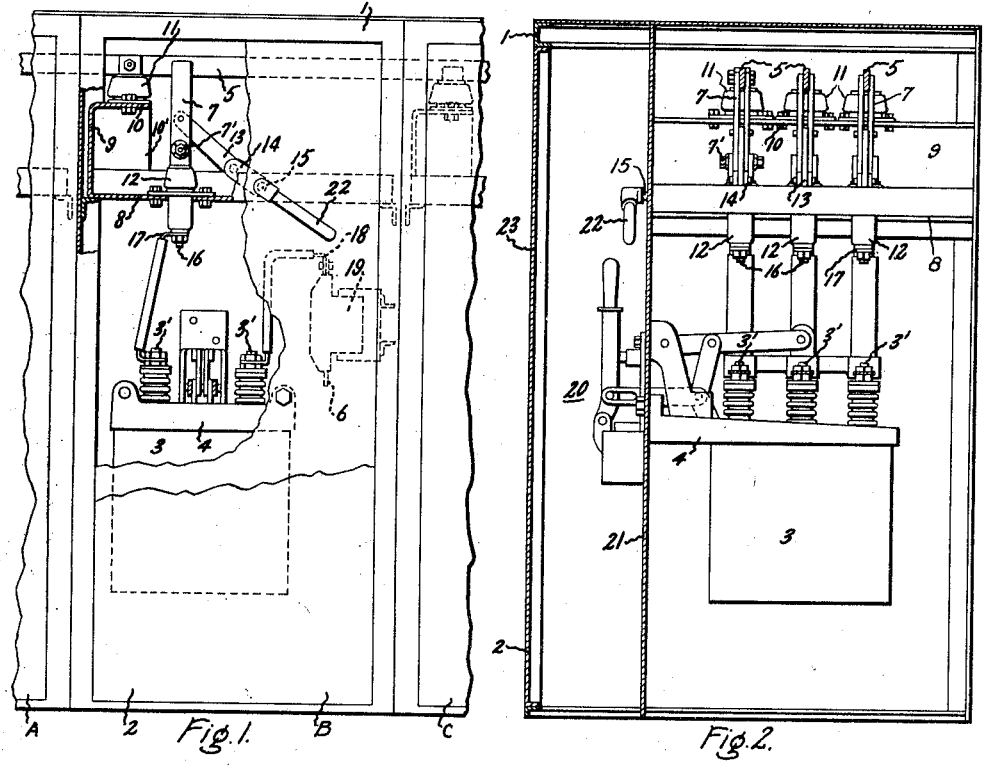
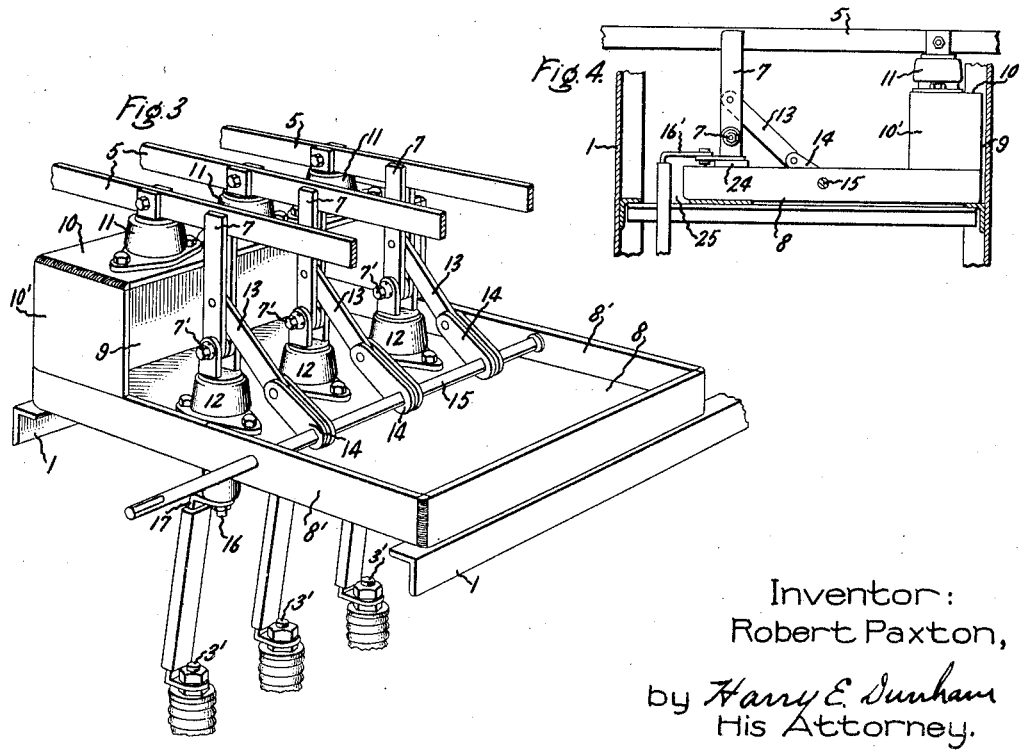
Inventor:
Robert Paxton,
by Harry E. Dunham
His Attorney.

Patented Jan. 18, 1938

2,106,061

UNITED STATES PATENT OFFICE 2,106,061

ELECTRIC SWITCH GEAR

Robert Paxton, Drexel Hill, Pa., assignor to General Electric Company, a corporation of New York Application March 12, 1936, Serial No. 68,430

7 Claims. (Cl. 175—298)

My invention relates to electric switch gear, more particularly to switch gear of the metal enclosed unit type wherein a plurality of similar switch gear units are joined to form a complete metal enclosed bus and switch station, and has for its principal object the provision of an improved switch gear unit of the above type which will be simple and compact in design, inexpensive in construction and which can be readily assembled with predetermined accuracy.

My invention will be more fully set forth in the following description referring to the accompanying drawing, and the features of novelty which characterize my invention will be pointed out with particularity in the claims annexed to and forming a part of this specification.

Referring to the drawing Fig. 1 is an elevational rear view, partly in section, of a switch gear cubicle unit embodying the present invention; Fig. 2 is an elevational side view of the unit in section; Fig. 3 is an enlarged perspective view of part of the structure shown in Figs. 1 and 2; and Fig. 4 is a view similar to a portion of Fig. 1 showing a slightly modified form of my invention.

The switch gear shown in Figs. 1 and 2 illustrates a form of metal enclosed bus and switch station wherein a plurality of generally similar switch gear units indicated in Fig. 1 as A, B, C are placed in alignment and joined so as to form a continuous bus. In the preferred form shown each unit comprises a stationary frame 1, which may be suitably constructed of angle members and sheet metal sides 2 to form a cubicle for the switch gear. A circuit breaker 3 of suitable interrupting capacity, such as an oil circuit breaker, for example, is suitably supported by a bracket 4 with respect to the stationary frame and is electrically connected, in a manner hereinafter described, to busbar structure 5 and a branch circuit indicated at 6.

A disconnect switch at 7 is connected in the circuit between the busbar and circuit breaker so as to isolate, in a well known manner, the circuit breaker and branch circuit with respect to the live bus when the circuit breaker 3 is open. As so far described the switch gear is of the well known cubicle type wherein the circuit breaker is stationary within the cubicle and the disconnecting operation is performed by separate operation of a disconnect switch, as contrasted with another form of metal clad switch gear wherein the circuit breaker is mounted for bodily movement to effect the disconnecting operation. It shall be understood, of course, that my invention may be applied if desired to either type of switchgear.

In the assembly of switchgear of the cubicle type it has heretofore been customary to mount separately various switchgear elements and structures within the cubicle thereby necessitating accurate individual alignment and positioning of the various bushings, disconnect switches, etc. in order that the unit would efficiently operate when complete. This, of course, required considerable time and increased the cost of factory production since each individual cubicle had to be constructed and assembled substantially on a custom order basis. In other words, such a method was obviously slow and comparatively expensive where construction of a large number of similar units for a bus and switch station was required.

For the purpose of simplifying the assembly within the cubicle, I divide the assembly into two main parts, namely, fabrication of the sheet metal cubicle in which the stationary oil circuit breaker is mounted, and separate fabrication of a sub-assembly unit as shown by Fig. 3, comprising the disconnect switch and busbar structures. The sub-assembly is mounted as a unit within the cubicle above the circuit breaker forming within the cubicle separate compartments, and the switchgear is then complete except for simple electrical connections and control wiring, the latter being omitted from the drawing in the interest of clearness.

As illustrated by Fig. 3, the sub-assembly unit for the busbar and disconnect switch structures comprises a sheet metal supporting base plate 8 which, when in position, is supported by angle members of the frame 1. One side of the base plate 8 is provided with a right angle vertical flange 9, which in the present instance is L-shaped and arranged so that the upper side 10 thereof overhangs and is substantially parallel with the base plate 8.

On this overhanging part 10 of the flange are mounted supporting insulators 11 for the phase busbars 5 respectively, the busbars 5 being in sections corresponding to a single switch gear unit so that the busbar sections of adjacent units may be joined to form a continuous bus. The flange 9 is preferably reinforced by side walls 10'.

The disconnect switches 7, which in the present instance are of the double blade type, are pivotally mounted at 7' on insulating supports or bushings 12 secured to and extending through the base plate 8 as shown by Fig. 1. The switches 7 are operable so as directly to engage the corresponding busbars by suitable operating linkage comprising links 13 and 14 connected to a common operating shaft 15. The shaft 15 is suitably mounted in lateral flanges 8' of the base plate, the flanges likewise providing greater rigidity for the unit.

The insulating supports 12 for the disconnect switches are formed as conductor bushings so that the pivoted terminal of the disconnect switch terminates beneath the base plate 8 in a conductor 16 which can be connected through the conductor 17 to the corresponding terminal 3' of the circuit breaker. Accordingly, when shaft 15 is rotated to move the disconnect switches clockwise, as viewed in Figs. 1 and 3, the terminals 3' of the circuit breaker are completely disconnected from the live bus.

In constructing the sub-assembly shown by Fig. 3 it will be apparent that any number of sub-assemblies may be made from a single plan without appreciable variation from each other. That is, by utilizing a single mounting structure the busbars, disconnect switches and through bushings may be accurately mounted in position on said structure so that alignment of the disconnect switches and busses is readily obtained independently of the positioning of the unit with respect to the cubicle. It will also be apparent that the simple electrical conductor 17 interconnecting the stationary terminal of the disconnect switch and corresponding terminal of the circuit breaker can readily be designed and applied so as to provide for such variations as might occur in the relative positioning of the sub-assembly unit and the circuit breaker. In the completed units shown by Figs. 1 and 2, a terminal 3' of the circuit breaker is connected through a conductor 18 to the branch circuit 6 through the customary current transformer 19 which is mounted on the side wall of the cubicle. The circuit breaker 3 is provided with an operating mechanism 20 extending through and mounted on the front wall 21 of the cubicle. The disconnect operating shaft 15 likewise extends through the wall 21 and terminates in a manually operated handle 22. A hinged front panel 23 may likewise be provided for supporting the various control instruments and meters (not shown) and for normally enclosing the operating means 20 and 22 for the circuit breaker and disconnect switches respectively.

In Fig. 4 there is shown a slightly modified form of my invention wherein the insulating mounting for the disconnect switch 7 is simplified so as to eliminate a through bushing. That is, the stationary terminal of the disconnect switch is mounted on an insulator 24 generally similar to the busbar supports 11. In this case the base plate 8 is spaced from a side wall of a cubicle so as to provide an opening 25 through which the conductor 16' interconnecting the stationary disconnect terminal and the circuit breaker terminal may extend. In other respects the design is essentially the same as that above described.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:—

1. Electric switch gear of the metal enclosed unit type comprising a supporting frame, a circuit breaker and busbar structure mounted in said frame, a partition forming in said frame compartments for said circuit breaker and busbar structure, respectively, said partition having a substantially right angle flange overhanging said partition at one side thereof forming therewith a unit independent of the switchgear enclosure, and insulating structure mounted on said flange for supporting said busbar structure in spaced relation to said partition.

2. Electric switch gear of the metal enclosed unit type comprising a supporting frame, a circuit breaker and busbar structure mounted in said frame, a metallic plate forming in said frame compartments for said circuit breaker and busbar structure, respectively, said plate having a rigid vertical flange, insulating structure mounted on said flange for supporting said busbar structure in spaced relation to said plate and disconnect contact structure supported by said plate included in the circuit between said busbar structure and circuit breaker.

3. Electric switch gear of the metal enclosed unit type comprising a supporting frame and circuit breaker and busbar structure mounted in said frame, disconnect switch contact structure for controlling the circuit between said busbar structure and circuit breaker, a supporting base plate for said busbar structure and disconnect contact structure forming in said frame compartments for said circuit breaker and busbar and disconnect contact structures respectively, said base plate having integrally joined thereto vertical flange structure, and insulating structure mounted on said flange structure for supporting said busbar structure in spaced relation to said base plate.

4. Electric switch gear comprising a supporting frame, a stationary circuit breaker mounted in said frame, busbar structure positioned above said circuit breaker within said frame, a metallic partition between said busbar structure and circuit breaker, a disconnect switch mounted on said partition, said partition having a vertical flange structure formed integrally therewith and insulating structure mounted on said flange structure for supporting said busbar structure in spaced relation to said partition so that the same can be directly engaged by said disconnect switch.

5. Electric switch gear of the metal enclosed unit type comprising a supporting frame and circuit breaker and busbar structure mounted in said frame, a metallic partition forming in said frame compartments for said circuit breaker and busbar structure respectively, said partition having an L-shaped flange extending vertically therefrom so that the upper portion of said flange is substantially parallel with and overhangs said partition and insulating structure mounted on said parallel flange portion for supporting said busbar structure.

6. In electric switch gear of the metal enclosed unit type including a supporting frame and a circuit breaker, busbar structure and disconnect switches for interconnecting said busbar structure and circuit breaker, a sub-assembly unit comprising a base plate adapted to be supported in said frame, said base plate having vertically extending flange structure at one end thereof, insulating structure mounted on said flange structure for supporting said busbar structure, disconnect switch structure pivotally mounted on said base plate for engaging said busbar structure and operating means including a rotatable shaft for said disconnect switch structure, said base plate having lateral flanges in which said shaft is rotatably mounted.

7. Electric switch gear of the metal enclosed unit type comprising a supporting frame, a circuit breaker and busbar structure mounted in said frame, a metallic plate forming in said frame compartments for said circuit breaker and busbar structure, respectively, said plate having an L-shaped flange extending vertically therefrom, the upper portion of said flange overhanging said plate, insulating structure mounted on said overhanging portion for supporting said busbar structure, a disconnect switch mounted on said plate cooperating with said busbar structure, and a conductor directly interconnecting said disconnect switch and said circuit breaker, said plate being spaced from a side wall of said frame to provide clearance for said conductor.

ROBERT PAXTON.